United States Patent
Tsubai et al.

(10) Patent No.: US 6,464,481 B2
(45) Date of Patent: Oct. 15, 2002

(54) SCROLL COMPRESSORS

(75) Inventors: Shinji Tsubai; Hiroyuki Gennami; Masao Iguchi; Naohiro Nakajima; Kazuo Kobayashi; Kazuhiro Kuroki; Masahiro Kawaguchi, all of Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 09/965,982

(22) Filed: Sep. 28, 2001

(65) Prior Publication Data

US 2002/0039539 A1 Apr. 4, 2002

(30) Foreign Application Priority Data

Sep. 29, 2000 (JP) ........................................ 2000-300153

(51) Int. Cl.⁷ .................................................. F03C 2/00
(52) U.S. Cl. ..................... 418/55.6; 418/188; 418/55.5; 418/57; 418/55.1; 417/369
(58) Field of Search ........................ 418/55.5, 57, 55.4, 418/188, 369, 55.1

(56) References Cited

FOREIGN PATENT DOCUMENTS

| | | | | |
|---|---|---|---|---|
| EP | 1 087 141 A2 | 3/2001 | | F04C/18/02 |
| JP | 3-92502 | 4/1991 | | F01C/1/02 |
| JP | 05164068 A | * 6/1993 | | F04C/18/02 |
| JP | 05288167 A | * 11/1993 | | F04C/18/02 |
| JP | 06010864 A | * 1/1994 | | F04C/27/00 |
| JP | 11-6487 | 1/1999 | | F04C/18/02 |

\* cited by examiner

Primary Examiner—Thomas Denion
Assistant Examiner—Theresa Trieu
(74) Attorney, Agent, or Firm—Morgan & Finnegan, LLP (57) ABSTRACT

Scroll compressor may include, for example, a stationary scroll, a drive shaft, a crank shaft coupled to the drive shaft, a bush coupled to the outer surface of the crank shaft and a movable scroll coupled to the crank shaft. The movable scroll is preferably disposed adjacent to the stantionary scroll. A boss may be coupled to the movable scroll and the boss preferably protrudes from the movable scroll at the opposite side of the stationary scroll. A seal is preferably disposed in a clerance defined between the bush and the boss. A compression chamber is defined by a space between the stationary scroll and the movable scroll. Fluid is compressed within the compression chamber when the movable scroll revolves or orbits with respect to the stationary scroll. A discharge port is preferably defined within the movable scroll and is adapted to discharge compressed fluid to a side that is opposite of the stationary scroll.

14 Claims, 9 Drawing Sheets

SCROLL COMPRESSORS

BACKGROUND OF THE INVENTION

1. Field of the Invention

The present invention relates to scroll compressors that may compress fluid by utilizing stationary and movable scrolls and particularly, to scroll compressors that can efficiently seal a high-pressure chamber or space within the scroll compressors. Such scroll compressors may be utilized in air conditioning systems and more preferably in vehicle air conditioning systems.

2. Description of the Related Art

A known scroll compressor is disclosed in Japanese Laid-open Patent Publication No. H11-6487, which scroll compressor includes a stationary scroll and a movable scroll disposed within a compressor housing. A compression chamber is defined by a space between the stationary scroll and the movable scroll. When the movable scroll moves with respect to the stationary scroll, the volume within the compression chamber is reduced and thus, fluid drawn into the compression chamber is compressed and discharged from the discharge port. The discharge port is provided within the movable scroll at the location corresponding to the compression chamber in its minimum volume. Fluid compressed in the compression chamber is discharged opposite to the stationary scroll. Further, the movable scroll has a boss that extends opposite to the stationary scroll. The boss is coupled to a drive shaft member such that the drive shaft member causes the movable scroll to move along an orbital path.

In order to prevent the compressed fluid from leaking to a lower-pressure chamber or space within the compressor housing, a seal is provided between the base plate of the movable scroll and the compressor housing so as to surround the boss of the movable scroll. However, according to the known scroll compressor, a relatively large area must be sealed in order to prevent the compressed fluid from leaking to the lower-pressure space, because the seal surrounds the outer circumferential surface of the boss.

SUMMARY OF THE INVENTION

It is therefore an object of the invention to provide improved scroll compressors that can effectively prevent the compressed fluid from leaking to a low-pressure space within the compressor.

In the representative scroll compressor according to the present teachings, fluid is compressed by utilizing a stationary scroll and a movable scroll and is discharged from a discharge port defined within the movable scroll. As the result, compressed fluid is discharged opposite to the stationary scroll. The movable scroll revolves or orbits with respect to the stationary scroll by means of a crank shaft. The movable scroll includes a boss that protrudes to the opposite side of the stationary scroll. A bush is coupled to the outer surface of the crank shaft. A seal is disposed between the bush and the boss.

According to the present teachings, high-pressure fluid can be prevented from leaking to low pressure spaces by sealing a relatively small area between the bush and the boss. Moreover, because the seal is disposed in a radial direction between the bush and the boss, a tight seal can be realized. Preferably, the seal may elastically deform in the radial direction of the crank shaft. Thus, the impact of the bush contacting the crank shaft, due to the compression force at the initial stage of operating the scroll compressor, can be reduced or alleviated.

Other objects, features and advantage of the present invention will be readily understood after reading the following detailed description together with the accompanying drawings and the claims.

DETAILED DESCRIPTION OF THE INVENTION

Representative scroll compressors are taught that may preferably include a stationary scroll, a drive shaft, a crank shaft, a movable scroll, a compression chamber and a discharge port.

The crank shaft may be coupled to the drive shaft and the bush may be coupled to the outer surface of the crank shaft. The crank shaft causes the movable scroll to generally orbit along a circular path with respect to the stationary scroll. The movable scroll is coupled to the crank shaft and the movable scroll is disposed adjacent to the stationary scroll. The movable scroll includes a boss that is coupled to the movable scroll. The boss protrudes from the movable scroll at the opposite side of the stationary scroll. The compression chamber is defined by a space between the stationary scroll and the movable scroll. Fluid may be compressed in the compression chamber when the movable scroll revolves or orbits with respect to the stationary scroll. The discharge port is defined within the movable scroll in order to discharge the compressed fluid to the opposite side of the stationary scroll.

Preferably, a seal may be disposed between the bush and the boss. The circumferential length of the clearance between the bush and the boss is much less, for example, than the circumferential length of the clearance between the boss of the movable scroll and the compressor housing. Therefore, the sealing area can be minimized and thus, high sealing efficiency can be obtained. In another aspect of the present teachings, the seal may elastically deform in the radial direction of the crank shaft. By elastically deforming in the radial direction, the seal can receive the relative displacement of the boss toward the bush. As the result, the seal elastically deforms in the axial direction of the crank shaft to receive the displacement of the boss and can alleviate or cushion the collision of these two elements.

In another aspect of the present teachings, the seal may preferably be defined as an annular ring. The annular ring may elastically deform in the radial direction of the crank shaft. Preferably, at least one of the inner circumferential surface of the boss and the outer circumferential surface of the bush may include an annular groove that is defined to receive the annular ring. Moreover, the seal may preferably be defined by a plain bearing provided between the boss and the bush.

Preferably, a spacer ring may be provided between the bush and the boss. The spacer ring may be coupled to the boss. In this connection, the seal may be provided between the inner circumferential surface of the spacer ring and the outer circumferential surface of the bush. Further, an auxiliary seal may preferably be provided downstream of the seal within a fluid leaking passage that permits the discharge port to communicate with the lower-pressure space that is defined within the compressor housing. By utilizing the auxiliary seal, the space between the seal and the auxiliary seal can be defined as a middle-pressure chamber within the compressor housing. Due to the middle-pressure chamber, the pressure difference which applies to the seals can be reduced. Thus, the sealing efficiency and durability can be increased.

Each of the additional features and method steps disclosed above and below may be utilized separately or in conjunction with other features and method steps to provide improved scroll compressors and methods for designing and using such scroll compressors. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

Figure 1:
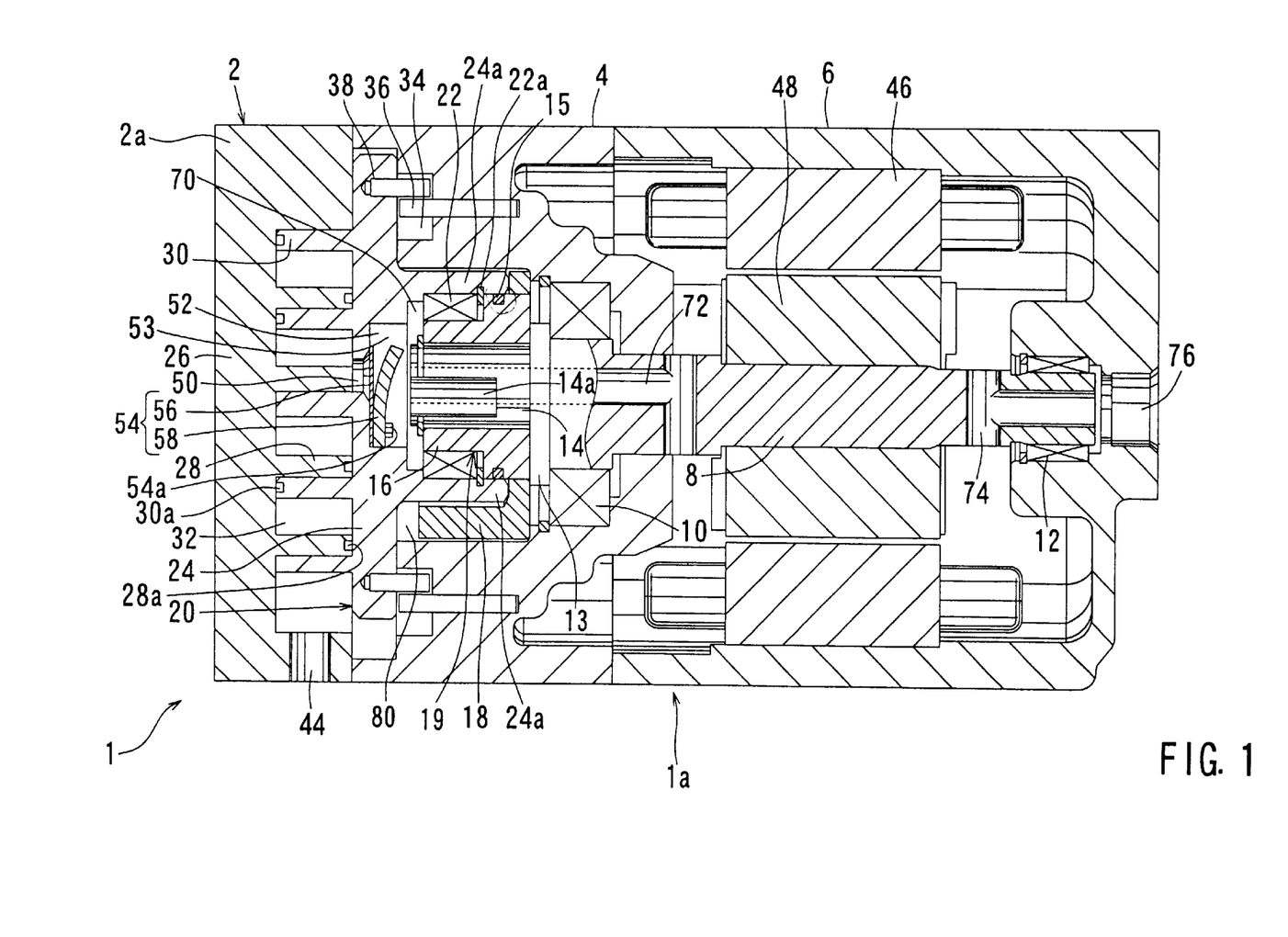
FIG. 1 shows a first representative scroll compressor.
Figure 2:
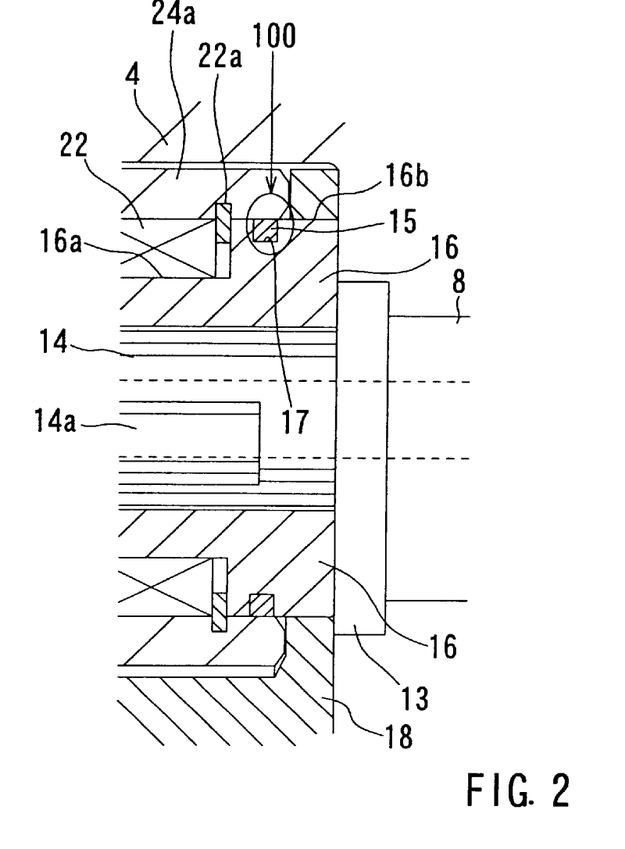
FIG. 2 partially shows the bush and the crank shaft in further detail.
Figure 3:
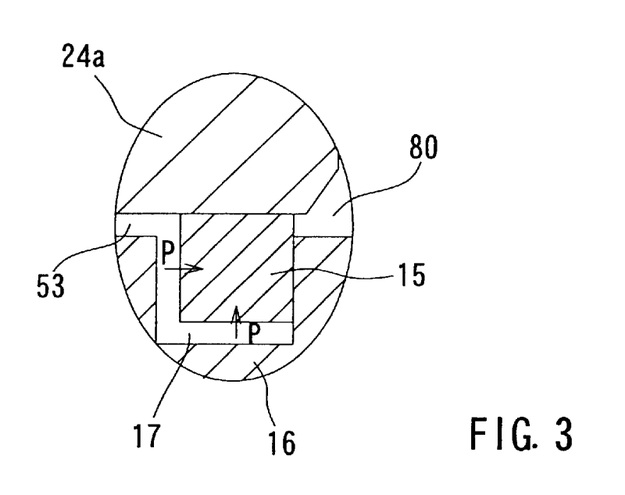
FIG. 3 shows the structure of the seal around area 100 shown in FIG. 2.

A first representative scroll compressor is shown in FIGS. 1 to 3 and may preferably be utilized within a refrigerant circulation circuit in a vehicle air-conditioning system. As shown in FIG. 1, a representative scroll compressor 1 includes a housing 1a defined by a center housing 4, a motor housing 6 and an end housing 2a. A stationary scroll 2 is provided within the end housing 2a. A movable scroll 20 and other appropriate devices for driving the movable scroll 20 are disposed within the housing 1a. One end surface of the center housing 4 is coupled to the end housing 2a and another end surface of the center housing 4 is coupled to the motor housing 6. A drive shaft 8 is rotatably supported by radial bearings 10 and 12 in both the center housing 4 and the motor housing 6. Within the center housing 4, an crank shaft 14 is integrally coupled to the end of the drive shaft 8. Although the drive shaft 8 is driven by an electric motor disposed in the motor housing 6 in this representative embodiment, the present teachings are also naturally applicable to scroll compressors, in which the drive shaft 8 is mechanically driven by the vehicle engine via belts, for example. The drive shaft 8 includes an annular-shaped base plate 13 at the side of the center housing 4. The diameter of the base plate 13 is larger that the diameter of the drive shaft 8. The crank shaft 14 is integrally coupled to the base plate 13 at the opposite side of the drive shaft 8.

Two mutually parallel planar portions 14a are defined on the crank shaft 14. In FIG. 1, however, only one planar portion 14a is shown for the sake of convenience of explanation. A bush 16 is disposed around the planar surfaces 14a so that the bush 16 may rotate together with the crank shaft 14. A balancing weight 18 is attached to one end of the bush 16 so that the balancing weight 18 can rotate together with the crank shaft 14. The movable scroll 20 includes a tubular boss 24a on the surface opposite to the stationary scroll 2 (on the right side of the movable scroll 20 in FIG. 1). Further, the bush 16 is coupled to the inner circumferential surface of the boss 24a by means of a needle bearing 22. The needle bearing 22 is coupled to the inner circumferential surface of the boss 24a by means of a stopper ring 22a.

The stationary scroll 2 includes a stationary volute wall 28 that protrudes from a base plate 26 of the stationary scroll 2 towards the movable scroll 20. The movable scroll 20 includes a movable volute wall 30 that protrudes from the base plate 24 of the movable scroll 20 towards the stationary scroll 2. The stationary volute wall 28 and the movable volute wall 30 are disposed adjacent to each other and preferably are aligned to engage or mesh with each other. A tip seal 28a is provided on the top end of the stationary volute wall 28 and a tip seal 30a is provided on the top end of the movable volute wall 30. The volute walls are also known in the art as spiral wraps and naturally, these terms can be utilized interchangeably.

The stationary volute wall 28 and the movable volute wall 30 make contact with each other at a plurality of positions and are positioned in meshing engagement. As the result, a plurality of compression chambers 32 with a crescent shape is defined within a space surrounded by the stationary scroll base plate 26, the stationary volute wall 28, the movable scroll base plate 24 and the movable volute wall 30. When the drive shaft 8 rotates, the crank shaft 14 revolves or orbits around the rotational axis of the drive shaft 8. The rotational axis may be defined as the center, longitudinal axis of the drive shaft 8. Thus, the distance between the crank shaft 14 and the rotational axis of the drive shaft 8 defines the diameter of the orbital path. When the movable scroll 20 revolves or orbits about the rotational axis of the drive shaft 8, the balancing weight 18 offsets the centrifugal force caused by the revolution of the movable scroll 20. The crank shaft 14 that rotates together with the drive shaft 8, the bush 16, the needle bearing 22 provided between the crank shaft 14 and the boss 24a of the movable scroll 20 define a revolutionary (orbital) mechanism 19 to transmit the rotational torque of the drive shaft 8 to the movable scroll 20 as a revolutionary (orbital) movement.

A discharge port 50 is defined within the base plate 24 of the movable scroll 20. Further, a discharge valve 54 is provided within a valve storage chamber 52. The valve storage chamber 52 is defined by a space on the rear surface (the surface opposing the crank shaft 14) of the base plate 24 of the movable scroll 20. The discharge valve 54 is disposed to face the discharge port 50 in order to open and close the discharge port 50. The discharge valve 54 includes a reed valve 56 and a retainer 58. The reed valve 56 has a shape that is sufficient to cover the opening of the discharge port 50. The retainer 58 faces the reed valve 56 and is disposed on the opposite side of the discharge port 50. Within the valve storage chamber 52, the reed valve 56 and the retainer 58 are fixed to the rear surface of the base plate 24 of the movable scroll 20 by means of a bolt 54a.

The rear surface of the base plate 24 of the movable scroll 20 faces a high-pressure chamber 53 that is defined by the valve storage chamber 52 and a space 70. The reed valve 58 is opened and closed based upon the pressure difference between the pressure within the high-pressure chamber 53 and the pressure within the discharge port 50, or the compression chamber 32. The reed valve 56 opens the discharge port 50 when the pressure within the compression chamber 32 is greater than the pressure within the high-pressure chamber 53. The reed valve 54 closes the discharge port 50 when the pressure within the compression chamber 32 is lower than the pressure within the high-pressure chamber 53. The retainer 58 supports the reed valve 54 and also defines the maximum aperture of the reed valve 54.

A plurality of spaces (recesses) 34 are provided equiangularly within the center housing 4 to face the base plate 24 of the movable scroll 20. First auto-rotation preventing pins 36 and second auto rotation preventing pins 38 are disposed within the space 34, respectively. The first auto-rotation preventing pins 36 are fixed to the center housing 4 and penetrate from the center housing 4 toward the movable scroll 20. The second auto-rotation preventing pins 38 are fixed to the movable scroll 20 and penetrate from the base plate 24 of the movable scroll 20 to the center housing 4 within the space 34. In this embodiment, a total of four first auto-rotation preventing pins 36 and second auto-rotation preventing pins 38 are provided. However, only one first and second auto-rotation preventing pins 36, 38 are shown in FIG. 1. The auto-rotation of the movable scroll 20 can be prevented by the engagement of the first auto-rotation preventing pins 36 with the second auto-rotation preventing pins 38.

A stator 46 is provided on the inner circumferential surface of the motor housing 6. Further, a rotor 48 is coupled to the drive shaft 8. The stator 46 and the rotor 48 define an electric motor that rotates the drive shaft 8. Thus, the present scroll compressors are particularly useful for hybrid or electric cars that operate using electric power. However, an electric motor is not essential to the present teachings and the present scroll compressor can be easily modified for use with internal combustion engines.

When the drive shaft 8 rotates together with the crank shaft 14, the crank shaft 14 revolves (orbits) around the rotational axis of the drive shaft 8. Also, the crank shaft 14 tends to rotate around its auto-rotating axis (which is the same as the rotational axis of the crank shaft 14). However, the first and second auto-rotation preventing pins 36 and 38 cause the movable scroll 20 orbit with the crank shaft 14 via the needle bearing 22, but the movable scroll 20 will not rotate about its central axis (i.e. auto-rotate). As a result of the orbital movement of the movable scroll 20 with respect to the stationary scroll 2, refrigerant gas (fluid) is drawn from a suction port 44 and closed into the compression chamber 32, which is defined between the stationary scroll 2 and the movable scroll 20. In conjunction with the revolution of the movable scroll 20, the surface of the second auto-rotation preventing pins 38 slides along the surface of the respective first auto-rotation preventing pins 36. During each revolution or orbit of the movable scroll 20 with respect to the stationary scroll 2, the second auto-rotation preventing pins 38 will slidably revolve or orbit around and along the surface of the first auto-rotation preventing pins 38 one time.

Thus, while the crank shaft 14 is revolving or orbiting, the movable scroll 20 is prevented from auto-rotating, because the outer surface of the second auto-rotation preventing pins 38 contact the first auto-rotation preventing pins 36 within the space 34.

When the crank shaft 14 orbits, the movable scroll 20, which is connected to the crank shaft 14 by the boss 24a and the needle bearing 22, orbits around the rotational axis of the drive shaft 8. When the movable scroll 20 orbits with respect to the stationary scroll 2, refrigerant gas (fluid) is drawn from the suction port 44 into the compression chamber 32 and the compression chamber 32 reduces its volume as the compression chamber moves toward the center of the scrolls 2, 20. Due to the volume reduction of the compression chamber 32, the refrigerant gas is compressed and reaches a high-pressure state.

The compressed high-pressure refrigerant gas is discharged from the discharge port 50 to the high-pressure chamber 53 when the discharge valve 54 opens the discharge port 50. The space 70 communicates with the interior of the motor housing 6 via a passage 72 defined inside the crank shaft 14 and the drive shaft 8. Further, the refrigerant gas is introduced into the motor housing 6 and is discharged via the passage 74, which is defined within the drive shaft 8, via an outlet 76 formed in a wall portion of the motor housing 6 to an external air conditioning circuit. Because the refrigerant gas is communicated through the interior of the motor housing 6, the refrigerant gas can cool the electric motor (i.e. rotor 48 and stator 46) during the operation.

As shown in FIG. 2, the outer surface of the bush 16 includes a small diameter surface 16a and a large diameter surface 16b. The needle bearing 22 is provided on the small surface 16a and the stopper ring 22a is provided between the small and large diameter surfaces 16a, 16b. An annular groove 17 is defined on the large diameter surface 16b and the annular groove 17 extends in the circumferential direction of the large diameter surface 16b. A seal 15, the sectional shape of which is rectangle, is disposed within the annular groove 17. The sectional shape of the annular groove 17 is rectangle. Preferably, the top surface of the seal 15 extends to and contacts the inner circumferential surface of the boss 24a in order to seal the clearance between the bush 16 and the boss 24a.

The seal 15 prevents the refrigerant gas from leaking from the high-pressure chamber 53 to the low-pressure chamber 80 (see FIGS. 1 and 3). The seal 15 preferably comprises an elastic material, such as rubber or other synthetic resin. By forming the seal 15 from an elastic material, the seal 15 can elastically deform when a force is applied to the seal 15.

As shown in FIG. 3, the seal 15 separates the high-pressure chamber 53 from a low-pressure chamber 80. Further, high-pressure refrigerant gas within the high-pressure chamber 53 may push the seal 15 toward the base plate 13 (see FIG. 2) and toward the inner circumferential surface of the boss 24a. The pushing force of the high-pressure refrigerant gas is shown in FIG. 3 by arrow "P". As the result, the seal 15 will deform so as to contact the side wall of the annular groove 17 (right side wall in FIG. 3) and the inner circumferential surface of the boss 24a. Thus, a tight seal can be secured. According to the first representative embodiment, the high-pressure chamber 53 can be separated from the low-pressure chamber 80 by providing the seal 15 between the outer circumferential surface of the bush 16 and the inner circumferential surface of the boss 24a. And the clearance in the radial direction of the bush 16 formed at the engagement surface of the bush 16 and the boss 24a can be minimized, because the movement of the movable scroll 20 in the axial direction is not required to consider in designing the compressor structure with high sealing efficiency. As the result, the tight seal can be realized with the seal 15 that contacts both the bush 16 and the boss 24a by elastically deforming in the radial direction of the bush 16. In this connection, the seal 15 engaged with the annular groove 17 is pushed toward the outer side surface of the annular groove 17 by the pressure difference between the high-pressure chamber 70 and the low-pressure chamber 80. Further, the seal 15 is pushed toward the inner circumferential surface of the boss 24a by the high-pressure refrigerant. Thus, the seal 15 can result the tight sealing effect with respect to the radial direction and the axial direction.

Figure 4:
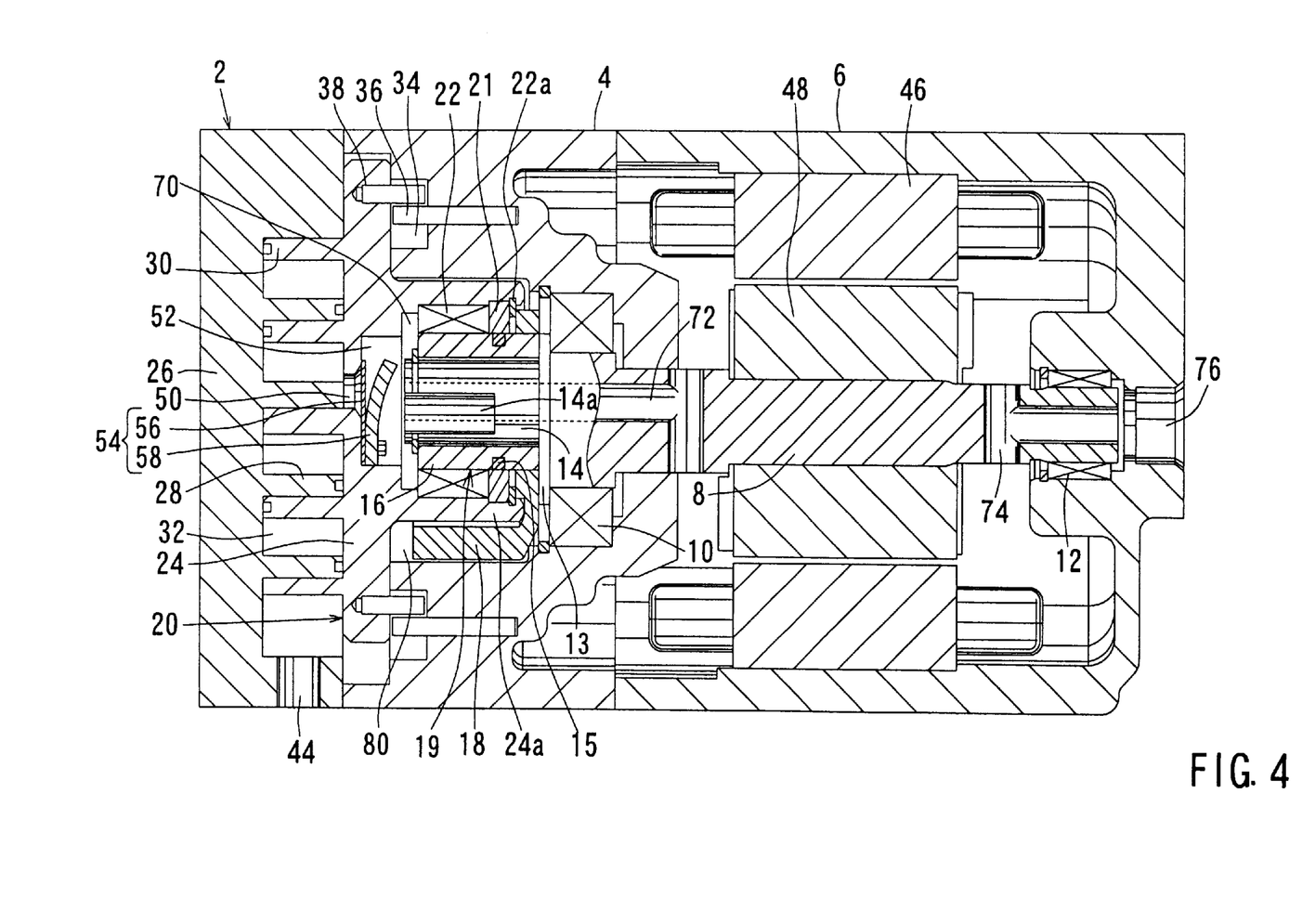
FIG. 4 shows a second representative scroll compressor.
Figure 5:
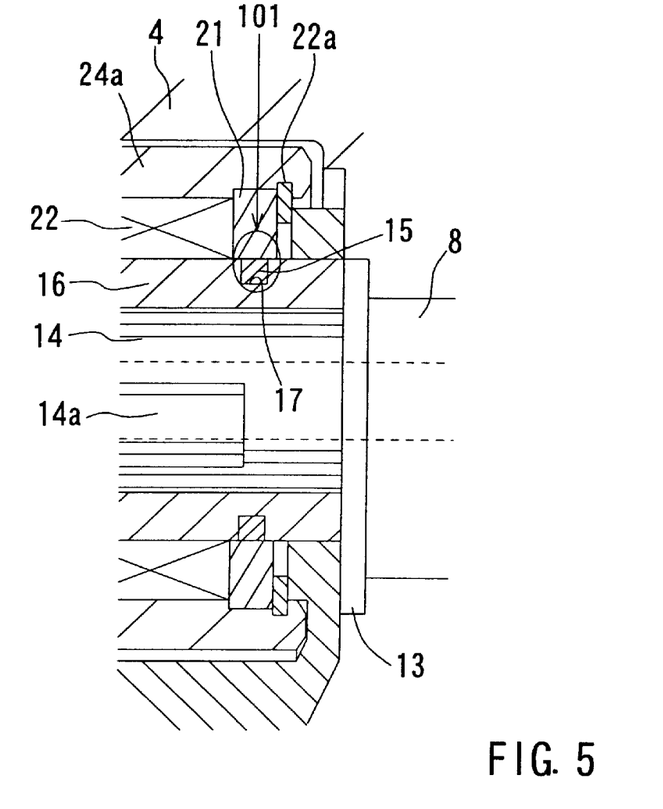
FIG. 5 partially shows the bush and the crank shaft in further detail.
Figure 6:
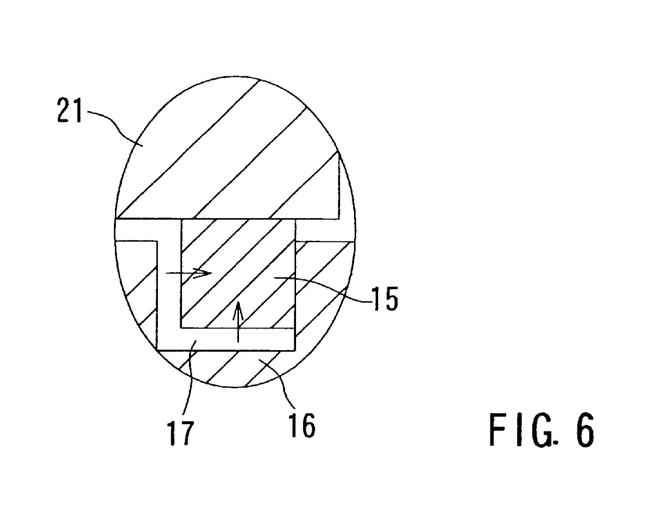
FIG. 6 shows the structure of the seal around area 101 shown in FIG. 5.

A second representative embodiment is shown in FIGS. 4 to 6. In the second representative scroll compressor, the outer circumference of the bush 16 is a single diameter. In other words, the bush 16 only includes the small diameter surface and the large diameter surface is omitted. By deleting the large diameter surface, a clearance is provided between the inner circumferential surface of the boss 24a and the outer surface of the bush 16 in accordance with the needle bearing 22. In this regard, a spacer ring 21 is provided within this space. The spacer ring 21 is affixed to the inner circumferential surface of the boss 24a and is clamped by the respective ends of the needle bearing 22 and a stopper ring 22a.

An annular groove 17 is defined to correspond to the spacer ring 21 on the outer circumferential surface of the bush 16. A seal 15 is defined within the annular ring 17. The seal 15 preferably comprises an elastic material, such as rubber or other synthetic resin. As shown in FIG. 6, when high-pressure refrigerant gas within the annular groove 17 pushes the seal 15, the seal 15 deforms to contact the spacer ring 21 and the side wall of the annular groove 17. As the result, a tight seal can be secured.

Due to the spacer ring 21, the bush 16 is not required to have a large diameter surface, while the seal 15 provided between the bush 16 and the spacer ring 21 can prevent the high-pressure refrigerant gas from leaking to the lower-pressure chamber in the compressor. Therefore, the rotational velocity of the bush 16 at its outer surface can be minimized and the durability of the seal 15 can be secured.

Figure 7:
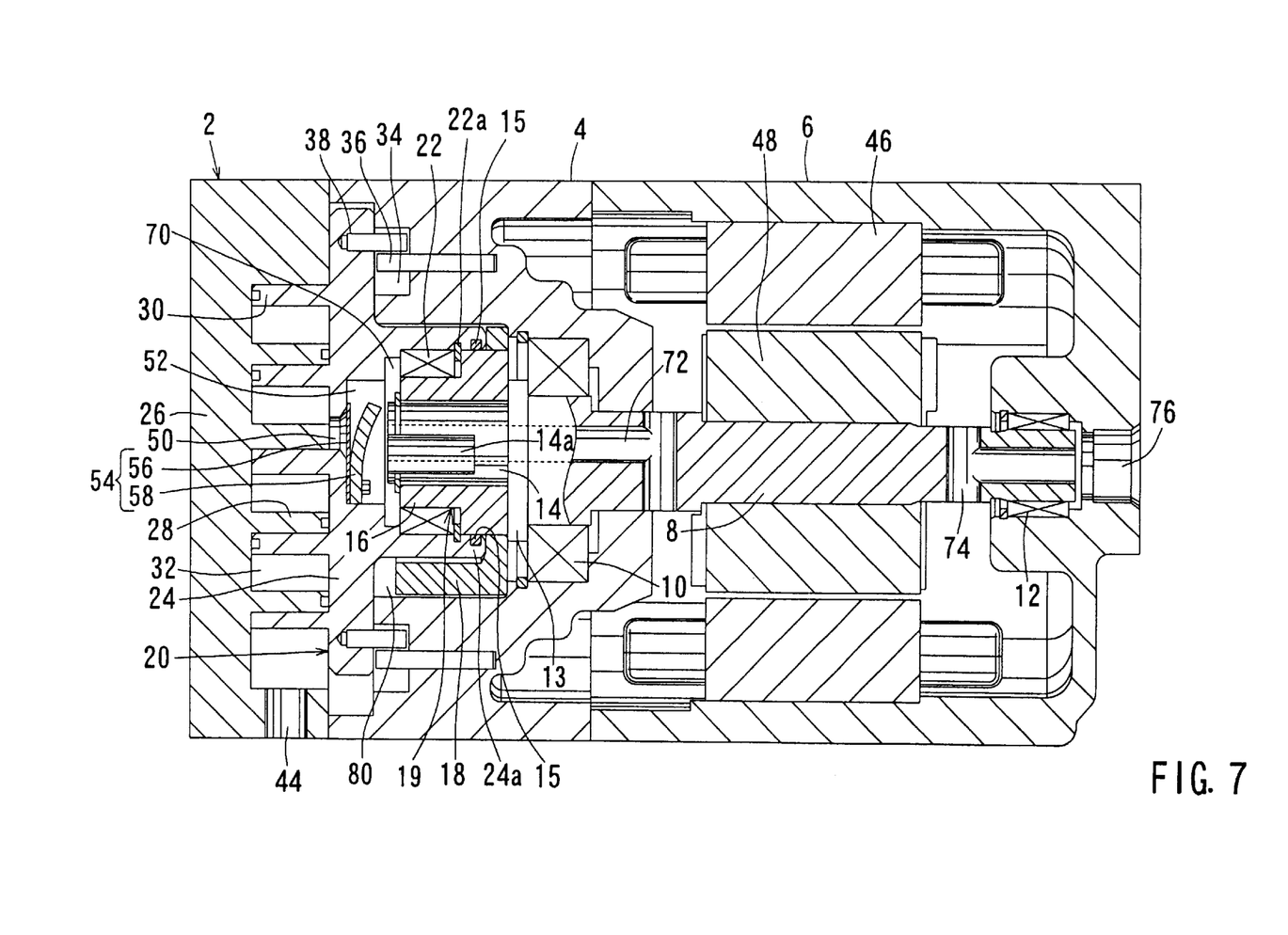
FIG. 7 shows a third representative scroll compressor.
Figure 8:
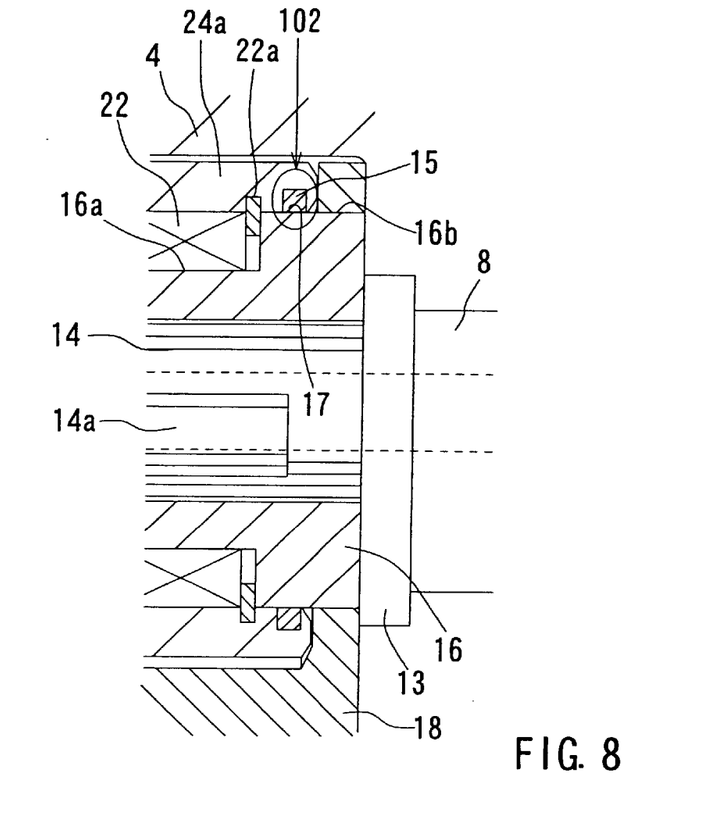
FIG. 8 partially shows the bush and the crank shaft in further detail.
Figure 9:
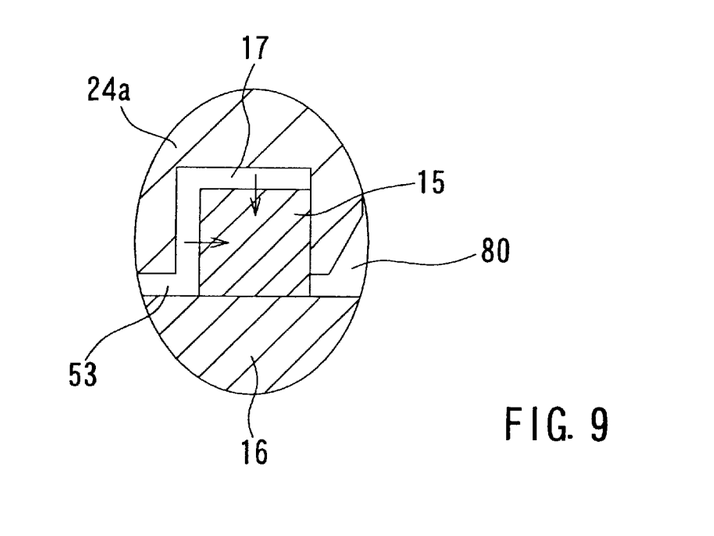
FIG. 9 shows the structure of the seal around area 102 shown in FIG. 8.

A third representative embodiment is shown in FIGS. 7 to 9. In the third representative scroll compressor, the seal 15 is disposed within the boss 24a. As shown in FIGS. 8 and 9, an annular groove 17 is defined on the inner circumferential surface of the boss 24a and the seal 15 is disposed within the annular groove 17. As shown in FIG. 9, when high-pressure refrigerant gas in the annular groove 17 pushes the seal 15, the seal 15 deforms to contact the outer circumferential surface of the bush 16 and the side wall of the annular groove 17. As the result, a tight seal can be secured.

Figure 10:
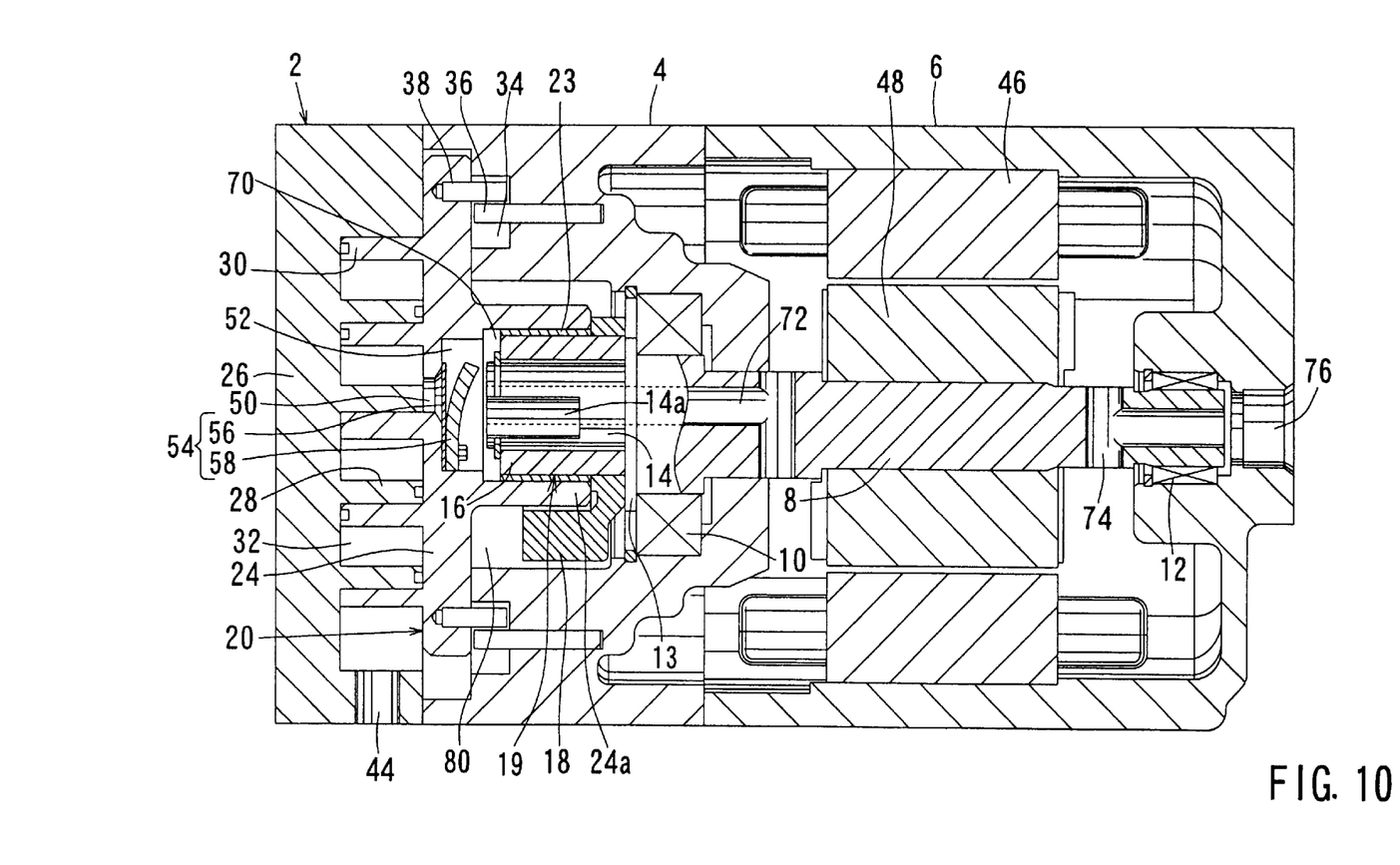
FIG. 10 shows a fourth representative scroll compressor.

A fourth representative embodiment is shown in FIG. 10. In the fourth representative scroll compressor, a plain bearing (slide bearing) 23 is utilized instead of the needle bearing 22. Further, the plain bearing 23 also functions as the seal. The plain bearing 23 has a cylindrical shape and is affixed to the inner circumferential surface of the boss 24a by utilizing pressure-joining technique. In other words, the plain bearing 23 is affixed to the boss 24a by a frictional fit. The plain bearing 23 is rotatably coupled to the outer surface of the bush 16. Because only a small clearance exists between the inner surface of the plain bearing 23 and the outer surface of the bush 16, the plain bearing 23 can have a sealing function. Preferably, the plain bearing 23 may extend along the entire length of the bush 16 in its axial direction in order to provide high sealing efficiency. According to the fourth representative embodiment, the plain bearing 23 can have a sealing function and a specific sealing means or member is not required. Therefore, the structure of the compressor can be simplified.

Figure 11:
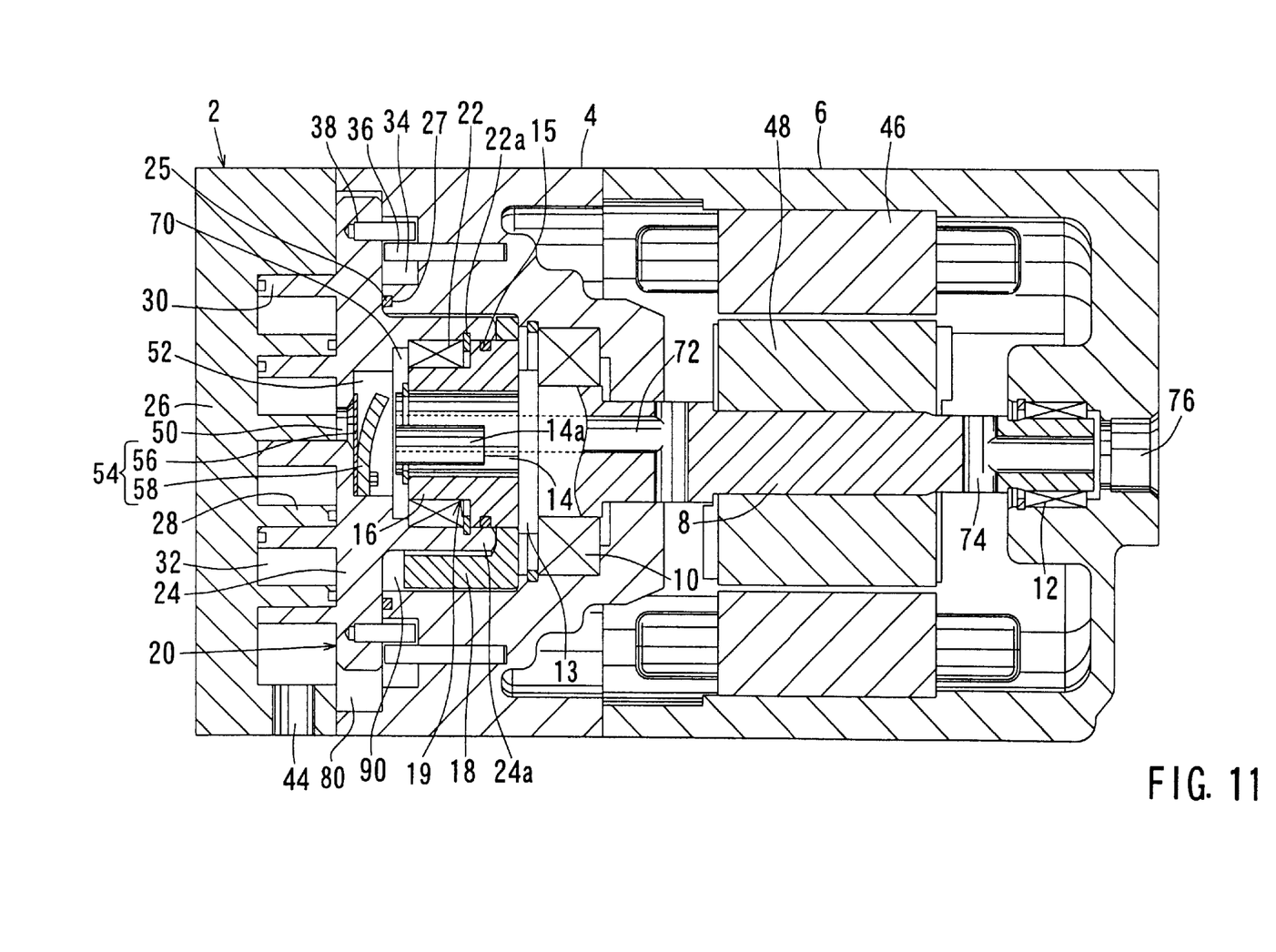
FIG. 11 shows a fifth representative scroll compressor.

A fifth representative embodiment is shown in FIG. 11. In the fifth representative scroll compressor, an auxiliary seal 25 is provided in addition to the seal 15. As shown in FIG. 11, an annular groove 27 is defined on the surface of the center housing 4 and faces the base plate 24 of the movable scroll 20. The auxiliary seal 25 is disposed within the annular groove 27 and contacts the base plate 24. As the result, a middle-pressure chamber 90 is defined by a space between the seal 15 and the auxiliary seal 25. In other words, the middle chamber 90 is provided downstream of the seal 15 within a refrigerant gas leaking passage defined between the discharge port 50 and the low-pressure chamber 80. The pressure within the middle-pressure chamber 90 is lower than the pressure within the high-pressure chamber 70 and is higher than the pressure within the low-pressure chamber 80.

Due to the middle-pressure chamber 90, the pressure difference across the two sides of the seal 15 can be minimized and therefore, the durability of the seal 15 can be improved. Further, not only the pressure within the space 70 and the valve storage chamber 52, but also the pressure within the middle-pressure chamber 90 can push the movable scroll 20 toward the stationary scroll 2. In other words, the back-pressure exerted onto the movable scroll 20 that pushes the movable scroll 20 toward the stationary scroll 2 can be increased due to the space 70, the valve storage chamber 52 and the middle-pressure chamber 90. Further, the area of the back-pressure that is applied to the movable scroll 20 can be increased. Therefore, because the movable scroll 20 can tightly engage the stationary scroll 2, energy loss during operation of the representative scroll compressor can be minimized.

Figure 12:
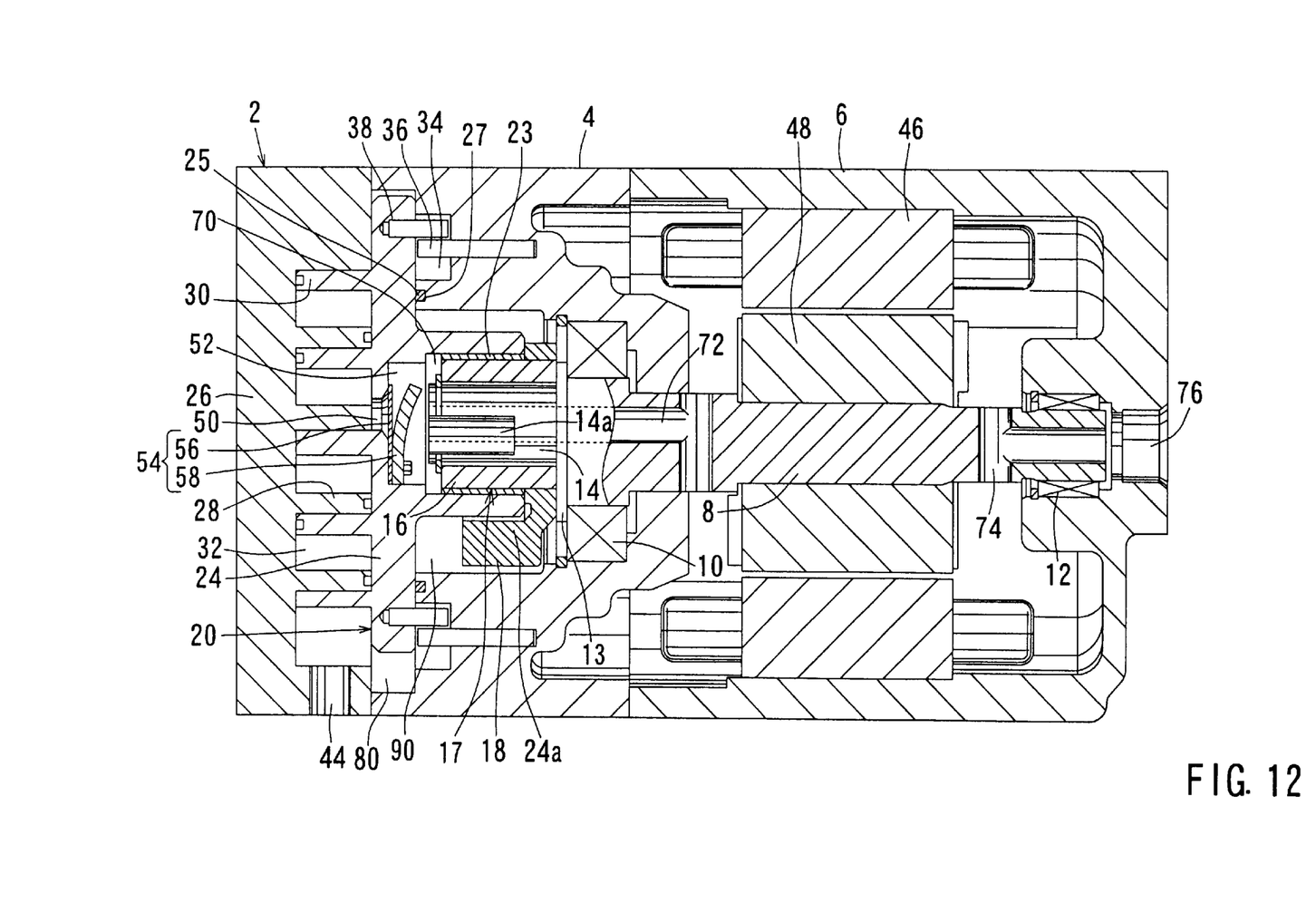
FIG. 12 shows a sixth representative scroll compressor.

A sixth representative embodiment is shown in FIG. 12. In the sixth representative scroll compressor, the seal is defined by a plain bearing 23 and an auxiliary seal 25 that is disposed within an annular groove 27 is defined on the surface of the center housing 4. The auxiliary seal 25 faces the base plate 24 of the movable scroll 20. As a result, a middle-pressure chamber 90 can be defined between the plain bearing 23 and the auxiliary seal 25.

The middle pressure chamber can be provided also within the second and third representative embodiment by utilizing the auxiliary seal. Further, the annular grooves 17 and 27 to receive the respective seals 15 and 25 can be established on both sides of bush 16 and the both 24a, as well as on both sides of center housing 4 and the base plate 24.

Further, in each representative embodiment, the annular groove 17, 27 can be disposed on both side of the surfaces that opposes to each other. Further, in the fifth and sixth representative embodiments, the annular groove 27 can be disposed at the movable scroll base plate 24. Moreover, the seal 15, 25 can have various cross-sectional shapes other than the rectangular shape. Further, the seal 15, 25 can be made of material other than elastically deformable material.

Further, the bush 16 can be seamlessly integrated with the crank shaft 14. In other words, the bush 16 can be omitted by increasing the substantial diameter of the crank shaft 14. In this modification, the outer surface of the crank shaft 14 that has an increased diameter may directly contact with the inner circumferential surface of the boss 24a. Further, the seal 15 may be disposed between the outer surface of the crank shaft 14 and the inner circumferential surface of the boss 24a.

Further techniques for making and using scroll compressors are taught in U.S. Patent Publication Numbers 2002-57975 and 2002-64474 and U.S. patent application Ser. No. 09/952,287, all of which are commonly assigned and are incorporated by reference as if fully set forth herein.

What is claimed is:

1. A scroll compressor comprising:

a stationary scroll, a drive shaft, a crank shaft coupled to the drive shaft, a bush coupled to the outer surface of the crank shaft, a movable scroll coupled to the crank shaft, the movable scroll disposed adjacent to the stationary scroll, a boss coupled to the movable scroll, wherein the boss protrudes from the movable scroll at the opposite side of the stationary scroll, a compression chamber defined by a space between the stationary scroll and the movable scroll, wherein fluid is compressed within the compression chamber when the movable scroll revolves or orbits with respect to the stationary scroll, a discharge port defined within the movable scroll and adapted to discharge the compressed fluid to a side that is opposite of the stationary scroll, a high-pressure chamber surrounded by the boss and a seal disposed between the bush and the boss, wherein the seal prevents the fluid from leaking from the high pressure chamber.

2. A scroll compressor according to claim 1, wherein the seal is defined by an annular ring that is elastically deformable in the radial direction of the crank shaft.

3. A scroll compress or according to claim 2, wherein at least one of the inner circumferential surface of the boss and the outer circumferential surface of the bush includes an annular groove that is defined to receive the annular ring.

4. A scroll compressor according to claim 1, wherein the seal is defined by a plain bearing provided between the boss and the bush.

5. A scroll compressor according to claim 1, further comprising a spacer ring disposed between the bush and the boss, wherein the seal is disposed between an inner circumferential surface of the spacer ring and an outer circumferential surface of the bush.

6. A scroll compressor according to claim 1, further comprising an auxiliary seal disposed downstream of the seal within a fluid leaking passage that permits the discharge port to communicate with a lower-pressure space that is defined within a compressor housing.

7. A scroll compressor according to claim 6, wherein a space is defined between the seal and the auxiliary seal and the space defines a middle-pressure chamber within the compressor housing.

8. A scroll compressor according to claim 1, wherein the drive shaft is rotated by an electric motor disposed within a motor housing and the fluid within the compression chamber is introduced to the motor housing through the discharge port.

9. A method of cooling a vehicle interior, comprising compressing a refrigerant gas within the compression chamber of the scroll compressor according to claim 1 and supplying the compressed refrigerant gas to a vehicle air conditioning system.

10. A method of preventing high-pressure fluid compressed within the compression chamber of the scroll compressor according to claim 1 from leaking to a lower pressure area within the scroll compressor according to claim 1, comprising sealing a clearance defined between the bush and the boss.

11. A scroll compressor comprising:

a stationary scroll, a drive shaft, a crank shaft coupled to the drive shaft, a bush coupled to the outer surface of the crank shaft, a movable scroll coupled to the crank shaft, wherein the movable scroll includes a boss that extends in the axial direction of the crank shaft, a compression chamber defined by a space between the stationary scroll and the movable scroll, wherein fluid is compressed within the compression chamber when the movable scroll revolves or orbits with respect to the stationary scroll, a discharge port defined within the movable scroll and adapted to discharge compressed fluid to a side that is opposite of the stationary scroll, a high-pressure chamber surrounded by the boss and means for sealing a clearance defined between the bush and the boss to prevent the fluid from leaking from the high pressure chamber.

12. A scroll compressor according to claim 11, wherein the sealing means prevents high-pressure fluid compressed in the compression chamber from leaking to a lower pressure area defined within the scroll compressor through the clearance between the bush and the boss.

13. A scroll compressor comprising:

a stationary scroll, a drive shaft, a drive shaft member including a crank shaft coupled to the drive shaft, wherein the central axis of the crank shaft is offset or displaced from the central axis of the drive shaft, a movable scroll coupled to the drive shaft member, wherein the movable scroll includes a boss that extends in the axial direction of the drive shaft member, a seal disposed between the drive shaft member and the boss, a compression chamber defined by a space between the stationary scroll and the movable scroll, wherein fluid is compressed within the compression chamber when the movable scroll revolves or orbits with respect to the stationary scroll and a discharge port provided within the movable scroll in order to discharge compressed fluid to the opposite side of the stationary scroll.

14. A scroll compressor according to claim 13, wherein the crank shaft directly contacts the boss and the seal is disposed between the crank shaft and the boss.

* * * * *

UNITED STATES PATENT AND TRADEMARK OFFICE
CERTIFICATE OF CORRECTION

PATENT NO.      : 6,464,481 B2
DATED           : October 15, 2002
INVENTOR(S)     : Tsubai et al.

It is certified that error appears in the above-identified patent and that said Letters Patent is hereby corrected as shown below:

Column 9,
Line 29, please delete "compress or according" and insert therefore -- compressor according --.

Signed and Sealed this

Twenty-fifth Day of February, 2003

JAMES E. ROGAN
*Director of the United States Patent and Trademark Office*